Dec. 28, 1937.  L. M. FRANCIS  2,103,669
VEHICLE CONSTRUCTION
Filed Dec. 19, 1935  2 Sheets-Sheet 1
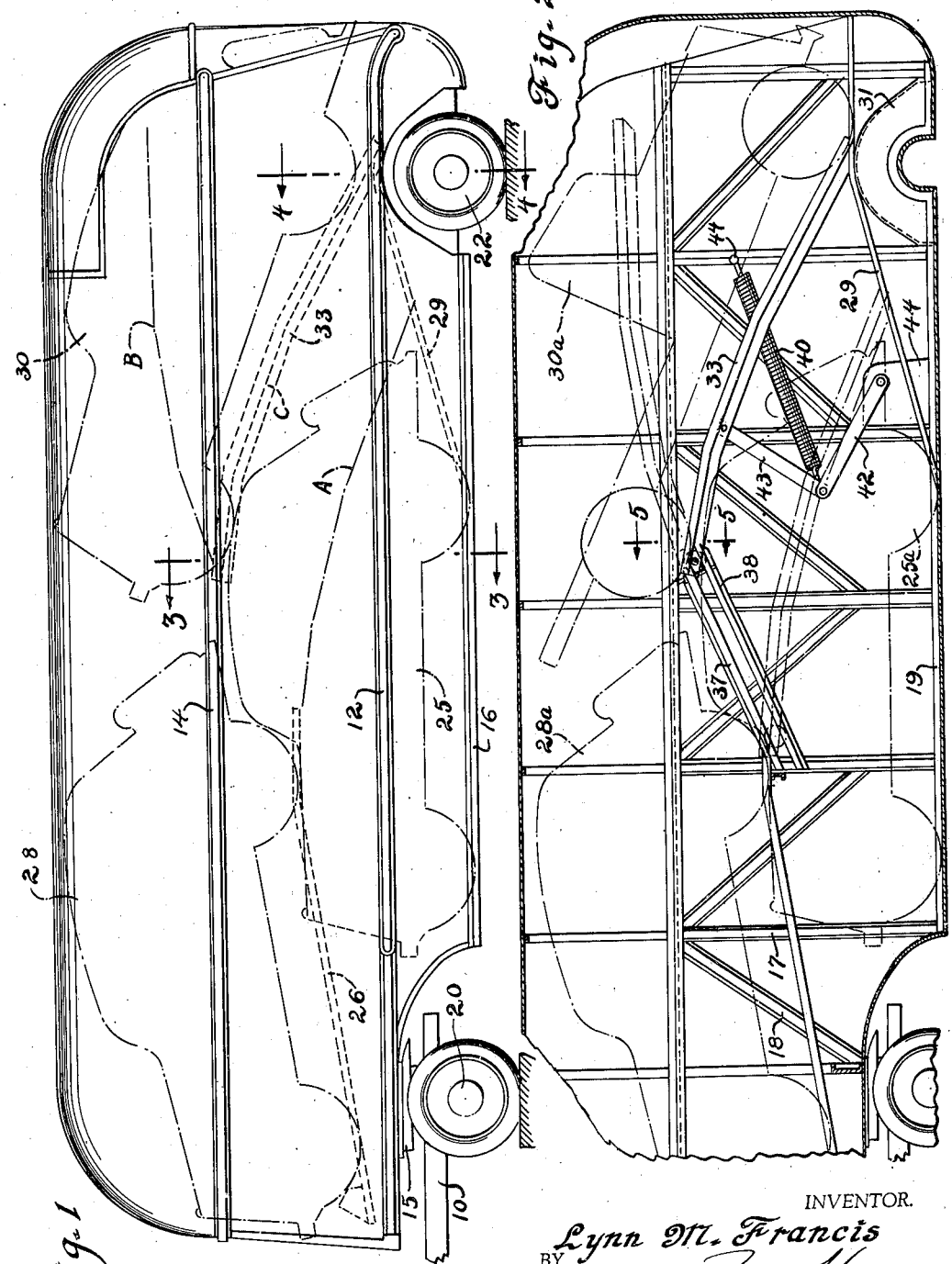
INVENTOR.
Lynn M. Francis
BY
ATTORNEYS.

Dec. 28, 1937. L. M. FRANCIS 2,103,669
VEHICLE CONSTRUCTION
Filed Dec. 19, 1935 2 Sheets-Sheet 2

INVENTOR.
Lynn M. Francis
BY
ATTORNEYS.

Patented Dec. 28, 1937

2,103,669

UNITED STATES PATENT OFFICE 2,103,669

VEHICLE CONSTRUCTION

Lynn M. Francis, Birmingham, Mich., assignor to Mechanical Handling Systems, Inc., Detroit, Mich., a corporation of Michigan Application December 19, 1935, Serial No. 55,193

20 Claims. (Cl. 296—1)

This invention relates to freight hauling conveyances of the sort used in the delivery and transportation of finished automobiles, trucks and the like. Dimensional limitations are a very important consideration in the construction of such conveyances, because of statutory regulations imposed by various highway authorities. The public has also become conscious of the manner and condition in which automobiles are delivered from the factory, while manufacturers and distributors for whom the cars are transported, usually under contract, also favor those haulaway agencies having equipment enabling the cars to be kept clean and in the best of condition during shipment, since the cleaning of automobiles delivered by driving, or in open transports, becomes quite an item of expense.

For these among other reasons, completely enclosed automobile hauling transports are rapidly gaining favor, but considerations of the number and size of cars transportable with equipment of suitable dimensions become more acute, when the transports are enclosed, particularly if effort is made to so construct them that external contours may present a pleasing and more or less streamlined appearance. It has been found extremely difficult to provide framework capable of supporting a maximum number of cars within such space limitations, yet enclosable in sheathing which may be provided with effectively rounded or tapering contours, although streamlining of these transports represents a true economy, for the reason that road speeds of forty-five and fifty miles an hour are frequent, and due to their bulk and frontal area the horsepower loss created by wind resistance is very great.

With these considerations in mind the present invention aims to furnish a most economical and compact structure enabling the transportation of a maximum number of cars within minimum dimensions, as well as cars of larger size than can ordinarily be carried, yet which may be enclosed in sheathing of pleasing and effectively streamlined contouring.

Another object of the invention lies in the provision of an improved double-decked transport for conveying automobiles in a novel arrangement. A related object is a novel shiftable track construction for such transports, facilitating the complete loading of the transport from one end, without the necessity of "jack-knifing" the tractor-trailer assembly, or removing the former, which construction, further, makes it possible to load the transport by merely driving the cars thereupon under their own power, and further does not require the use of long cumbersome or elaborate special gang or loading tracks.

An additional object is the provision of such an enclosed trailer having a framework of relatively simple and inexpensive construction, throughout which the loads are well and evenly distributed in a most economical manner.

Another object is the provision of such a double-decked trailer having running gear of improved arrangement and construction, incorporating dual wheels having portions closer together than the width of the cars carried upon the transport, adequate springing being provided between the wheels and frame, yet so arranged that springing of the wheels cannot interfere with the load, while the running gear also offers no obstacle to loading the transport.

A further object inheres in the provision of an improved upper deck track section swingable to any of three positions, and which during loading of the vehicle may be depressed to a position lower than its operative one to form a runway providing approach from the rear to the forward upper deck track section, and which may also be elevated to afford access to the lower deck tracks during loading, while when occupying an operative intermediate position it blocks access to the lower tracks and provides an elevated support for another car, the arrangement being such that the carried automobiles may interfit in a manner most economical of space.

A still further object is the provision in such a transport of a combined loading and load-carrying track construction movable both vertically and longitudinally but yet securable with respect to the vehicle, which track is alignable with other fixed track portions for loading the latter, and fixable in another position for independently supporting a load of its own during service.

Still another object lies in the construction of such a double decked trailer provided with means for supporting the automobiles loaded thereupon in an arrangement which although double-decked, maintains a relatively low center of gravity of the total load, and even distribution thereof upon the wheels of the hauling equipment, and accordingly provides for stability during operation.

Other objects and advantages will be apparent from the following description, wherein reference is made to the accompanying drawings illustrating preferred embodiment of the invention, and wherein similar reference numerals designate similar parts throughout the several views.

In the drawings:

Figure 1 is a view in side elevation of a semi-trailer incorporating the principles of this invention, fragmentarily showing a tractor and diagrammatically indicating the principal positions occupied by the shiftable combined load-carrying and loading track;

Figure 2 is a central vertical section, partly broken away, showing the guiding and counterbalancing means for the shiftable track and indicating an alternative variety and arrangement of load which the vehicle is designed to accommodate;

Figure 3:
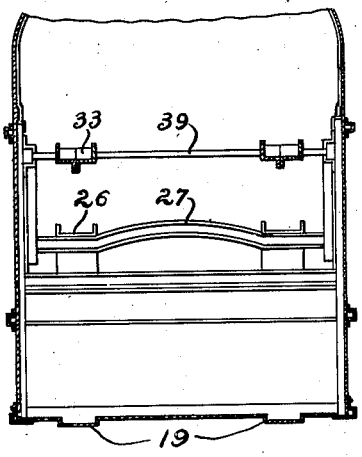
Figure 4:
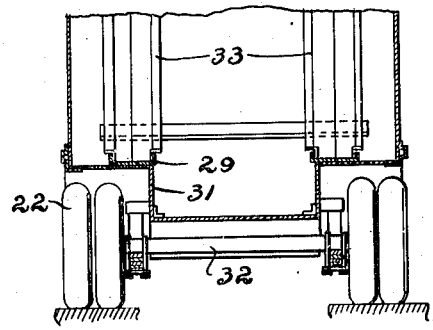
Figure 5:
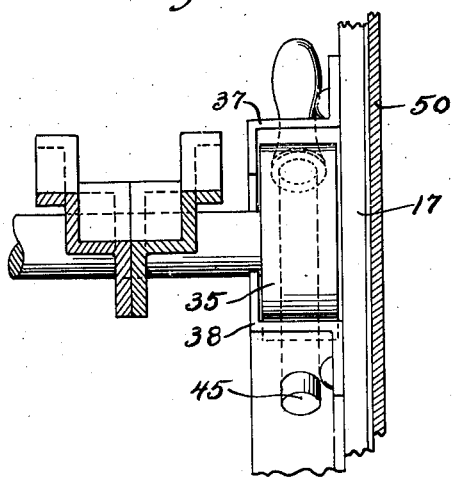
Figure 6:
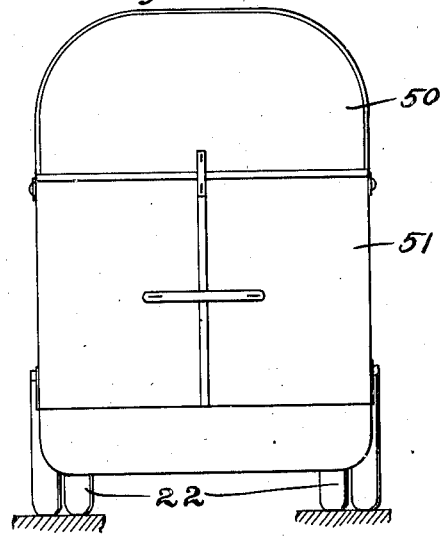

Figures 3 and 4 are detail sections taken substantially upon lines 3—3 and 4—4 respectively of Figure 1, and looking in the direction of the arrows;

Figure 5 is a detail section of the locking means for the shiftable track, taken substantially on the line 5—5 of Figure 2 and looking in the direction of the arrows;

Figure 6 is a rear elevation.

Referring now to the drawings:

Although shown applied to the construction of a semi-trailer adapted to be supported at its front extremity by a tractor as 10, the principles of the present invention will be seen to be readily applicable to trucks, trailers and freight-hauling vehicles of various descriptions. The supporting framework consists of a main longitudinal girder 12 and top and bottom longitudinal girders 14—16, the latter carrying dropped floor or lower deck tracks 19. Supporting and bracing elements 17—18 form with the girders a trussed framework of a more or less conventional arrangement, clearly illustrated, throughout which the loads are evenly distributed by virtue of the manner in which the tracks are supported, as will presently appear. The dropped floor portion does not extend to the front of the vehicle, the front overhang at the elevation of the main girders 12 being supported directly on the rear of the tractor, as by the conventionally illustrated fifth wheel assembly 15.

The lower deck tracks 19 will also be seen to be located entirely forward of the trailer wheels 22, and to constitute a horizontal support for an automobile, as 25, which may be loaded thereupon by simply running it under its own power over the approach tracks 29, which extend from the rear entrance over the wheels and downward into connection with the tracks 19. In the forward portion of the framework and partly overhanging the tractor are raised tracks 26 inclined downwardly toward the front and adapted to support another automobile, as 28, above and overlying the hood portion of the car 25. Tracks 26 may be fixed in place, being shown carried by cross bracing elements 27 attached to the side frame members 17.

The trailer may be provided with dual wheels (22) between which, if standard tread limitations are observed, sufficient room cannot be allowed to drive a car. Since, however, the approach trackway 29 passes over the wheel housings 31 (being permanently secured in place), the springing movements of the wheels and of axle 32 offer no interference. A third car as 30 is arranged to be carried in an elevated and oppositely inclined position, with its hood overlying the rear of the lower car, while its higher body portion inclines downwardly and occupies the place directly above the wheels 22, such car being carried by vertically and longitudinally shiftable tracks 33 which when in load-carrying position are arranged as shown in dotted lines in Figure 1.

As also indicated diagrammatically in Figure 1, the shiftable tracks 33 are movable to either of two other positions, designated A and B, and shown in dot-dash lines. In the first of these positions the front ends of such tracks are aligned with the rear ends of tracks 26, and extend downwardly therefrom toward the rear of the trailer to rest upon approach tracks 29. When in this position tracks 33 form loading ways for the front elevated tracks 26, providing approach thereto from the rear of the trailer, which permits simply running car 28 into position under its own power. It will be seen that from position A, tracks 33 may not only be elevated but shifted bodily to the rear to position B, in which position they are raised high enough above tracks 29 to allow running car 25 into position over the wheels, via approach tracks 29, in the manner previously described. During such movement of tracks 33 to position B the front ends thereof also rise sufficiently to provide clearance for the top of car 25, and in the subsequent movement of these tracks to the operative position (C) their front ends remain raised, but their rear ends are lowered, as shown, to a position in which they may again rest upon tracks 29, or other suitable support at the lower rear extremity of the trailer. This track is then also in a position enabling direct loading of car 30 thereupon under its own power.

While any of various supporting means might be provided for the front extremities of tracks 33, I prefer the arrangement shown in the drawings, in which rollers 35, traveling between rails 37—38 carried by the side frames guide the tracks, which are shown connected for unitary movement, as by cross member 39 which also serves as an axle for rollers 35, although this also is a matter of choice, and the tracks might be separately movable—which in fact makes for ease of operation if the construction be heavy. One such guiding assembly is provided upon each side, and to facilitate their movement each track is preferably further guided and counterbalanced by spring means as 40 acting through toggle linkage 42, 43. The links are centrally articulated, at which point the counterbalance spring may be connected; one link as 42 being pivoted to the frame, and the other, 43, to the track. The spring is of course of sufficient length and resiliency to allow for the longitudinal travel, and may be pivotally anchored to the frame as upon gusset 44. With the aid of such counterbalancing and guiding means the track may easily be moved by hand to the several positions described. When in the operative position (C) auxiliary support for the shiftable tracks is preferably provided, such as pins 45, passed through and across the space between rails 37—38 beneath the rollers 35 to lock them and the tracks 33 in position.

Due to the angular positions in which cars 28—30 are carried, the roof and side sheathing, shown diagrammatically and designated 50, may be considerably tapered and rounded toward both the ends and sides of the vehicle. Doors, as 51, need only be provided at the rear, since it is not necessary to either jack-knife or remove the tractor to load the front tracks. Due also to the car arrangement and the inclination of both the forward tracks and the shiftable tracks, it is usually possible to accommodate at least one truck of the type having a low body or provided with cab only, upon tracks 33, provided such truck is backed into position to face the rear, as indicated at 30a in Figure 2. The frame of the truck then extends beyond and over the rear of the front upper deck car, 28a. Carrying a truck in this fashion, frequently highly desirable, is impossible with any comparable transport construction of which I am aware.

The use of dual wheels, while not imperative, is preferred for the reason that not only is tire life greatly increased, but the safety of the transport in use is also augmented. The narrower spacing of the inner wheels makes the driver less apt to get the wheels entirely off the edge of the road upon one side when forced to run close to the shoulder. The fact that at best the load carried by transports of this class is of high, heavy and swaying character has long made the use of dual wheels a desideratum, without, to my knowledge, a practical method of employing such wheels having previously been advanced.

What I claim is:

1. A vehicle of the class described comprising a framework having an entrance at one end and running gear including wheels arranged near said same end, a lower support arranged in substantially horizontal position and below the tops of the wheels upon the opposite side of the wheels from said end, a raised support at the opposite end of said framework and at least partly overlying said lower support and inclined downwardly away from said opposite end, an approach runway extending over said wheels and downward to said lower support from said end, a shiftable upper runway-support movable to one position to bridge the space between the upper end of said raised support and the approach runway, means for supporting said runway-support in a super-elevated position high enough above said approach runway to allow clearance thereabove for passage of a car thereover to said lower support, and means for securing said runway-support in an intermediate inclined position in which at its end nearest said raised support it is elevated above the level of the top of a car carried by the lower support, and the other end thereof extends downward toward the approach runway to block the latter and allow support of another car in a position partly overlying said approach runway and the wheels and partly overlying a car carried by the lower support.

2. A vehicle construction as set forth in claim 1 in which said runway support is shiftable longitudinally of the vehicle as well as movable vertically.

3. In a vehicle construction as set forth in claim 1, means adjacent the higher end of said raised support for guiding an end of said runway-support in a path between said higher end of the raised support and a position still higher, the opposite end of said runway-support being swingable from a point adjacent said approach runway and below said end of the raised support to a position higher than said raised support.

4. In a vehicle construction as set forth in claim 1, means adjacent the higher end of said raised support for guiding an end of said runway-support in an angular path between a position in which it forms a continuation of said raised support at the higher end thereof and extends downwardly therefrom to the approach runway, and a higher position spaced longitudinally of the vehicle from said raised support, said runway-support being pivotally movable about said guided end when said end is in said higher position to raise the entire runway-support clear of the approach runway.

5. A vehicle of the class described comprising a framework having an entrance at one end and running gear including dual wheels arranged near said end, a lower support arranged in substantially horizontal position below the tops of such dual wheels and upon the opposite side thereof from said end, a raised support at the opposite end of the framework partly overlying said lower support and inclined downwardly away from said end, an approach runway extending over said wheels and downward to said lower support, and a shiftable upper runway-support movable to bridge the space between the upper end of said raised support and the approach runway, means for supporting said runway-support in a super-elevated position high enough above said approach runway to allow entrance of a car over said approach runway to the lower support, and means for securing said runway-support in an intermediate inclined position in which at one extremity it is depressed and lies close to said approach runway and at the other extremity is elevated slightly higher than a car carried by said lower support, whereby another car may be carried in oppositely inclined position to a car carried by said raised support and partly overlying the opposite end of the lower support.

6. In a vehicle of the class described, in combination with a framework, wheels near one end thereof, a substantially horizontal lower support, a pair of raised inclined supports partly overlying opposite ends of said lower support, holding means for maintaining said raised supports in substantially aligned elevated position at their adjacent ends whereby a car may be run from one to the other, and for maintaining said inclined supports in another separated elevated position, at least one of said inclined supports having a portion normally blocking access to the lower support but movable vertically to afford access from one end of the vehicle to said lower support, and an approach runway extending from one end of the vehicle to said lower support.

7. A vehicle construction as set forth in claim 6 in which said movable support portion is shiftable longitudinally into and out of substantially aligned and abutting relation with respect to the other raised support.

8. A vehicle construction as set forth in claim 6 in which said movable support is shiftable longitudinally and into and out of substantially aligned abutting relation with respect to the other raised support, including means for supporting the aligned end in a depressed position when so aligned, such depressed position being too close to the lower support to provide clearance for a car thereupon.

9. A vehicle construction as set forth in claim 6 in which said movable support is shiftable longitudinally of the framework in a path inclined to the horizontal and is alignable in abutting relation with respect to the nearer end of the other raised support, means for supporting said end of the shiftable support in depressed position when so aligned, and means for supporting said end of said shiftable support in a higher operative position.

10. A vehicle construction as set forth in claim 6 in which the movable support is shiftable longitudinally and into and out of aligned relation with respect to the other raised support, and means for supporting the end of said shiftable support nearer said end of the vehicle in depressed position and close to said approach runway in either position of longitudinal shiftability of the shiftable support.

11. The method of loading a wheeled conveyance for automobiles and the like, said conveyance having a plurality of supports arranged at different levels including a lower support and oppositely inclined elevated supports arranged at least partly thereover and higher over the central portion than the ends, one of said elevated supports being movable, which comprises placing the movable elevated support in a position in which it may serve as an approach runway for the other elevated runway, running a car through the conveyance from one end over such movable support and onto said other elevated runway, moving said movable support to another, non-interfering position with respect to the lower support, running a second car from said same end of the conveyance onto the lower support, placing the movable support in another inclined position after said second car is positioned upon the lower support, which position partly overlies such car at the same end of the conveyance, and running a third car onto said movable support from the same end of the conveyance.

12. The method of loading a wheeled conveyance for automobiles and the like, said conveyance having a plurality of supports arranged at different levels including a lower support and upper supports normally spaced from each other and arranged in oppositely inclined positions at least partly over the lower support and higher over the central portion thereof than the ends, one of said elevated supports being movable, which comprises placing the movable elevated support in a position in which it extends through the load-space of the lower support and may serve as an approach runway for the other elevated support, running a car through the conveyance from one end over such movable support and onto the other elevated support, moving the movable support to another position of non-interference with respect to the lower support, running a second car from said same end of the conveyance onto the lower support, placing the movable support in another inclined position above the load-space of the lower support after said second car is positioned upon the lower support, which position partly overlies such second car at the same end of the conveyance, and running a third car onto said movable support from the same end of the conveyance.

13. The method of loading a wheeled conveyance for automobiles and the like, said conveyance having wheels near one end and an entrance at said end, and a plurality of supports arranged at different levels including a lower support below the level of the wheel tops, and elevated supports normally spaced from each other and arranged in oppositely inclined relation at least partly over the lower support, one of said elevated supports being movable and the other fixed, which comprises placing the movable support in a position in which it extends through the load-space of the lower support and downward theretoward from the fixed elevated support to form a loading runway for said fixed support, running a car through the conveyance from said end over the wheel tops and over such movable support onto the fixed support, moving the elevated support to another position of non-interference with respect to the load-space of the lower support and the approach thereto over the wheel tops, running a second car over the wheel-tops and onto said lower support, placing the movable support in another inclined position above the load-space of the lower support after the second car is positioned upon the lower support, which position partly overlies such second car at the same end of the conveyance, and running a third car onto said movable support from the same end of the conveyance.

14. In a vehicle of the character described, in combination with a frame having running gear including wheels near one end of the frame and an entrance at said end, a dropped lower support upon the opposite side of the wheels from the entrance and lower than the tops of the wheels, an entrance-way extending over the running gear from said entrance and downwardly to said lower support, elevated supporting means including a fixed upper support at the opposite end of the frame from the entrance and arranged in inclined position at least partly overlying the lower support and higher at its end nearer the mid-portion of the frame, a movable upper support, and means for fixing said movable support in either of two positions, in one of which it terminally abuts the higher end of the fixed upper support and extends downwardly therefrom through the frame and the load-space of the lower support toward the entrance-way, and blocks said entrance-way, to serve as a gangway for the fixed upper support, and in another of which it is held in a generally similarly inclined load-carrying position clear of the load space of the lower support but also blocking said runway, said movable support being also movable to another position of non-interference with respect to said entrance-way to enable loading said lower support via the entrance-way.

15. A vehicle construction as set forth in claim 14 in which in the last mentioned position the end of the movable support nearer the entrance and the runway is raised out of blocking position with respect to said runway.

16. A vehicle construction as set forth in claim 14 in which at its end farther from the entrance the movable support is slidably and pivotally supported, the end nearer the entrance being freely movable.

17. A vehicle construction as set forth in claim 14 in which at its end farther from the entrance the movable support is slidably supported for movement in an inclined path toward and from the fixed upper support, and the end of the movable support nearer the entrance is movable into and out of blocking proximity to the runway.

18. A vehicle construction as set forth in claim 14 in which at its end farther from the entrance the movable support is slidably and pivotally supported for slidable movement in an inclined path toward and from the fixed upper support, and the end of the movable support nearer the entrance is pivotally movable vertically about the pivotal support in an out of a position of blocking proximity with respect to the runway.

19. A vehicle construction as set forth in claim 14 in which at its end farther from the entrance the movable support is slidably and pivotally supported for slidable movement in an inclined path toward and from the fixed upper support, and the end of the movable support nearer the entrance is pivotally movable vertically about the pivotal support into and out of a position of blocking proximity with respect to the runway, and means at least partly counterbalancing the weight of said movable support and urging it toward the entrance end of the vehicle.

20. In a vehicle of the character described, in combination with a frame having wheels near one end thereof and an entrance at said end including an entrance-way over the wheels, a dropped lower support upon the opposite side of the wheels from the entrance and lower than said entrance-way, elevated supporting means including a fixed upper support at the opposite end of the frame from the entrance and arranged in inclined position at least partly overlying the lower support and higher at its end nearer the mid-portion of the frame, a movable upper support, and means for fixing said movable upper support in either of three positions, in one of which it terminally abuts the higher end of the fixed upper support and extends downward therefrom through the frame and the load-space of the lower support toward the entrance runway, and blocks said runway, to serve as an approach track for the fixed upper support, and in another of which it is held in a generally similarly inclined load-carrying position clear of the load space of the lower support but also blocking said runway, and in a third of which it is elevated to a position of non-interference with respect to said run-way to enable loading the lower support via said runway.

LYNN M. FRANCIS.